United States Patent [19]

Battiston, Sr. et al.

[11] Patent Number: 4,640,301

[45] Date of Patent: Feb. 3, 1987

[54] FOLDABLE WALKER WITH PLUNGER ACTUATED LATCH ASSEMBLY

[75] Inventors: Joseph D. Battiston, Sr.; Joseph Battiston, Jr., both of Clifton, N.J.

[73] Assignee: Tubular Fabricators Industry, Inc., Passaic, N.J.

[21] Appl. No.: 729,724

[22] Filed: May 2, 1985

Related U.S. Application Data

[62] Division of Ser. No. 440,051, Nov. 8, 1982.

[51] Int. Cl.$^4$ ............................................. A61H 3/00
[52] U.S. Cl. ........................................ 135/67; 135/74; 403/85; 403/98; 403/325; 403/328
[58] Field of Search .............. 403/328, 325, 330, 324, 403/93, 96, 98, 85; 135/67, 74, DIG. 9

[56] References Cited

U.S. PATENT DOCUMENTS

| 1,119,505 | 12/1914 | Green | 403/96 X |
| 2,796,916 | 6/1957 | Womble | 135/67 |
| 2,839,321 | 6/1958 | Selig | 403/106 |
| 2,926,034 | 2/1960 | Weaver | 403/328 |
| 3,691,866 | 9/1972 | Berkes | 403/85 X |
| 3,945,389 | 3/1976 | Smith | 135/67 |
| 3,993,088 | 11/1976 | Thomas | 135/74 X |
| 4,056,115 | 11/1977 | Thomas | 135/67 |
| 4,244,237 | 1/1981 | Sprunger | 403/96 X |
| 4,298,016 | 11/1981 | Garelick | 135/67 |

Primary Examiner—Robert A. Hafer
Assistant Examiner—Arnold W. Kramer
Attorney, Agent, or Firm—David A. Jackson

[57] ABSTRACT

A locking assembly is disclosed which is suitable for releasably locking two articulated pivoting members in a fixed position with respect to each other. The locking assembly comprises a spring biased reciprocating latch, a plunger attached to the latch, and a catch plate adapted to rotate into locking engagement therewith. The plunger and latch are preferably integral with each other, so that the latch contains a minimum number of moving parts. The latch is designed so that simple palm pressure will cause it to disengage from the catch plate, to permit the pivoting members to move with respect to each other. The present locking assembly is of simple design and inexpensive manufacture, and is durable in use. The locking assembly is particularly applicable for use in invalid appliances such as collapsible walkers, where the users have limited manual dexterity. The simple design of the present locking assembly assures a minimum of mechanical breakdown in use, that is particularly important in the instance where the user of the device is infirm or elderly.

The present invention also includes a collapsible walker utilizing the present locking assembly.

9 Claims, 9 Drawing Figures

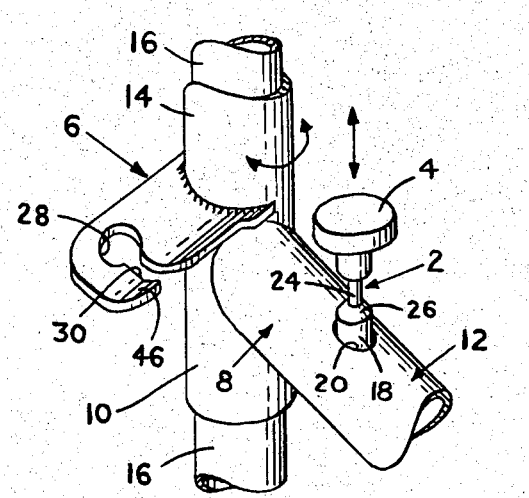
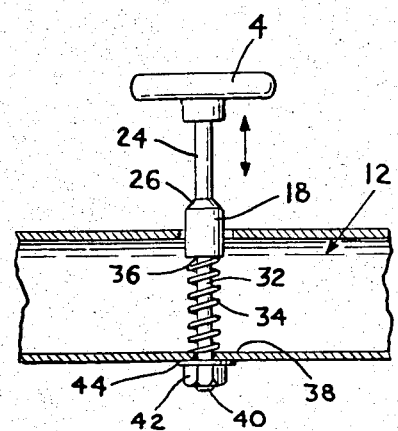
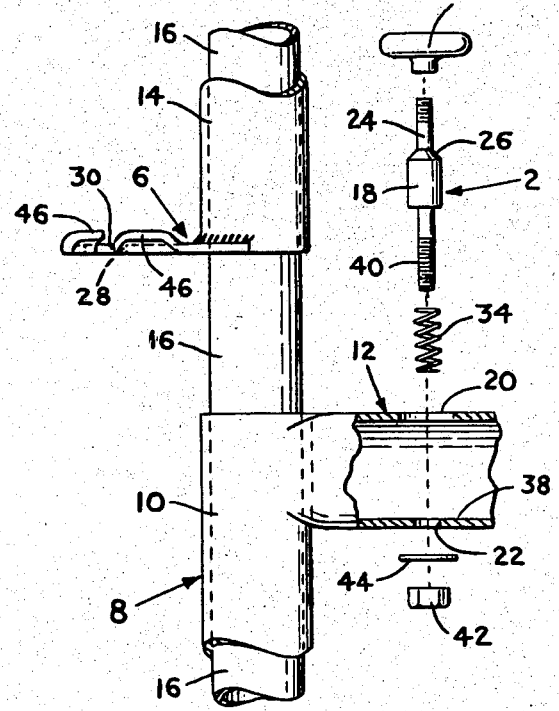
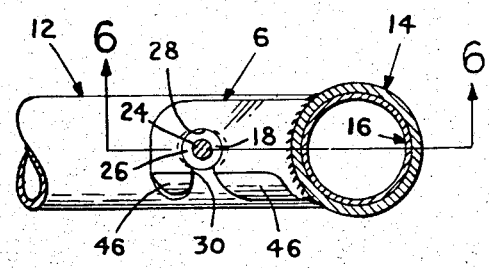
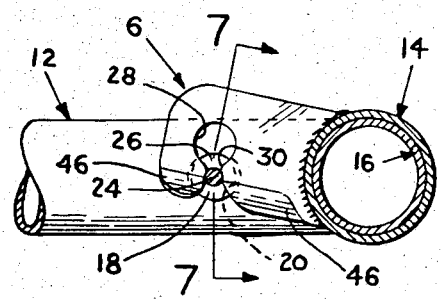
FIG. 1
FIG. 2
FIG. 3
FIG. 4
FIG. 5

FOLDABLE WALKER WITH PLUNGER ACTUATED LATCH ASSEMBLY

This is a division of application Ser. No. 440,051, filed Nov. 8, 1982.

BACKGROUND OF THE INVENTION

1. Field of the Invention:

The present invention relates generally to locking devices for releasably fixing two rotating members in a given position with respect to each other, and more particularly to such locking devices as utilize push button release mechanisms.

2. Description of the Prior Art:

The use of spring-loaded push buttons as locking devices, to lock a pair of mutually sliding members is well known in the art. In general, such locking pin devices are used with collapsible equipment such as folding walkers and other apparatus specially designed for invalids. Representative appliances utilizing various locking devices are disclosed in the following U.S. patents: U.S. Pat. Nos. 3,783,886 to Thomas; 3,840,034 to Smith; 3,945,389 to Smith; 4,056,115 to Thomas; and 4,180,086 also to Thomas.

Of the patents recited, U.S. Pat. No. 4,056,115 recognizes that the prior art locking devices, comprising spring-loaded push buttons and the like, are difficult to manipulate, particularly by individuals with limited manual dexterity who frequently require the aid of such appliances. The '115 patent makes reference to various approaches that attempted to minimize or overcome the problem with spring-loaded locking pins. Thus, U.S. Pat. No. 3,688,789 is noted, in addition to those listed above, that describes the use of an actuating lever that when pressed against the frame of the walker draws the locking pin out of its locking hole, and permits the telescoping tubular members to slide with respect to each other. The '115 seeks to remedy the aforementioned deficiencies by providing a retrofittably adaptor comprising a sleeve with a reciprocable plunger disposed therein, which is adapted to align with the conventional push button assembly, to permit the user to urge the push button inward by simple palm depression.

Like the prior art devices discussed within its disclosure, the adaptor of the '115 patent provides an inadequate remedy to the basic problem. The disclosed adaptor, when retrofitted, tends to slip in operation, which the result that it can malfuntion in use and thus render the locking mechanism totally inoperable without repair. Further, whether used in a retrofitting capacity, or as part of original construction, the adaptor of the '115 patent does not confer an economy in manufacture of such devices, which is crucial in most instances to the ultimate purchasers thereof. The adaptor of the '115 patent makes use of the conventional spring loaded locking pin which, by its own design is subject to mechanical failure and jamming in use.

One of the above listed patents illustrates a variation on the approach taken by the '115 patent, in which locking is effectuated between two members that rotate with respect to each other. Thus, U.S. Pat. No. 3,945,389 disloses a collapsible walker utilizing a corner brace extending from the gate leg to the connecting cross brace, the corner brace having a longitudinal slot therein that passes along a shaft mounted in the corner brace to permit the gate leg to pivot with respect to the cross brace in conventional fashion. The locking means comprises a spring loaded pin or button that extends outward from the cross brace and is adapted to engage a corresponding opening or detent in the corner brace, to lock the gate leg in the opened position with respect to the cross brace. A depressible tab is pivotally mounted on the corner brace and is adapted to communicate with the opening that receives the pin from the cross brace, with a dimple or other protrusion that, when depressed, drives the pin inward to permit the corner brace to slide with respect to the cross brace.

While this latter construction differs from that of the '115 patent, it shares the common element of a push button lock that is constructed and operates in the conventional manner, and therefore with the same limitations. Likewise, the exact alignment of the depressible member may vary, and in use, the dimple may wear, so that depression of the pin may be difficult if possible at all, and the invalid may encounter the same mechanical difficulties as with the walker constructions discussed above.

A need therefore exists for a revised lock design, for use with invalid walkers and other apparatus having members rotatable with respect to each other, that is of simple and durable design and operation and is reduced in cost of manufacture.

SUMMARY OF THE INVENTION

In accordance with the present invention a locking assembly is disclosed for use with structural members adapted to pivot into and out of longitudinal alignment with each other. The locking assembly comprises a spring biased combination plunger and latch, mounted for reciprocation within the first pivoting member, and a catch plate mounted on the second pivoting member adapted to releasably engage the combined plunger and latch, and having a collar therein to releasably retain the latch, and track extending from the collar having a width less than the diameter of the collar, to guide the latch as it enters and escapes from the collar.

The combined plunger and latch of the present invention comprises a spring biased locking bolt defining at one end, a frustoconical beveled cam adapted to slide along the track of the catch plate and to guide the locking bolt into the collar. A reduced diameter guide rod extends upward from the cam to maintain the line of travel of the latch, through the track of the catch plate. On its opposite end, locking bolt is attached to its rotating member and adapted for spring biased reciprocation. In the instance where the rotating member is a tubular structure, the latch is mounted traverse to the longitudinal axis of the tube, with both ends protruding from appropriate openings therein. The guide rod at the end opposed from the cam, may be fixed in position by the application of a retaining device such as a threaded nut or the like. A spring biasing means, comprising a reduced diameter connecting rod terminating in a land disposed traverse to the axis of the locking bolt and connected to the locking bolt, is provided. An appropriate coil spring may be placed to rest against the land, and at its opposite end, to urge against the interior surface of the tube. In this way, downward depression of the plunger is counteracted upon release, by upward expansion of the spring.

In one embodiment of the invention, the catch plate may be open ended. Thus the track may terminate at a mouth, allowing the latch to fully escape from the catch plate. In such instance, the mouth is positioned at a slight acute angle in the direction of the reduced diameter guide rod, to provide a bearing surface to smoothly engage the beveled cam of the latch.

In an alternate embodiment, the catch plate has a closed ended track, and the catch plate is pivotally associated with a support bracket, so that it may pivot about 2 points in operation. Thus, after the locking bolt escapes from the collar, the latch travels along the track, while the catch plate pivots into alignment with the tubular member containing the combined plunger and latch. In the instance where this assembly is utilized with an invalid walker, the bracket and catch plate are so positioned that, when the walker is placed in the folded, storage position, the bracket and catch plate are in substantial alignment with the cross brace of the walker. In this embodiment, the bracket is in the plane containing the gate legs, which comprise the other rotating member.

The latch includes in combination, a plunger, as the reduced diameter guide rod extends upward and is adapted to slidably receive a plunger knob thereon. The operation of the locking assembly of the present invention is possible with simple palm pressure and is therefore desirable for use by invalids and others of limited dexterity. The construction of the combined plunger and latch is unitary and integrated, so that the difficulties noted with respect to the prior art are eliminated.

Also, the simple construction of the present locking assembly facilitates reduced costs of manufacture which is particularly important in the area of invalid appliances. A reduced number of moving parts are required, and the likelihood of breakdown is accordingly minimized. In addition to the specific utility of the locking assembly with invalid devices, it can be seen that a variety of applications exist, in instances where it is desirable to releasably lock rotating articulated structural members with respect to each other.

In a yet further aspect of the present invention, an invalid walker is disclosed which comprises a central cross brace, defining cylindrical bearings, and paired gate legs rotatably journaled within said bearings and adapted to rotate from a closed position of co-planar alignment, to an opened position approximately parallel to each other and transverse to the plane of the cross brace. The walker of the present invention includes a locking assembly comprising catch plates mounted upon said gate legs, and corresponding latches with plungers thereon, mounted on the cross brace, on the upper surfaces thereof adjacent to the bearings. Release of the locking assembly, as mentioned earlier, requires simple palm pressure by the user to cause the latch to recede from the collar, whereupon the user may rotate the gate legs toward the cross brace, to close the walker. The walker may be opened and locked in position simply by rotating the legs outward from each other. No further manipulation of the locking assembly is necessary during this procedure.

Accordingly, it is a principal object of the present invention to provide a locking assembly for use with two articulated rotatable members, that facilitates operation by palm pressure.

It is a further object of the present invention to provide a locking assembly as aforesaid that is of simple and durable construction and operation.

It is a still further object of the present invention to provide an invalid appliance utilizing the present locking assembly, that offers ease of manipulation with reduced effort on the part of the user.

Other objects and advantages will become apparent to those skilled in the art from a review of the ensuing description which proceeds with reference to the following illustrative drawings.

BRIEF DESCRIPTION OF THE DRAWINGS

FIG. 1 is a fragmentary perspective of a locking assembly of the present invention.

FIG. 2 is an exploded fragmentary view of the locking assembly of FIG. 1.

FIG. 3 is a side sectional view of the plunger and latch component of the locking assembly of the present invention.

FIG. 4 is a top view of the locking assembly of FIG. 1 with the plunger knob removed, showing the locking assembly in the engaged position.

FIG. 5 is a top view similar to FIG. 4 showing the locking assembly in a disengaged position.

DETAILED DESCRIPTION

Figures 6, 7, 8, 9:
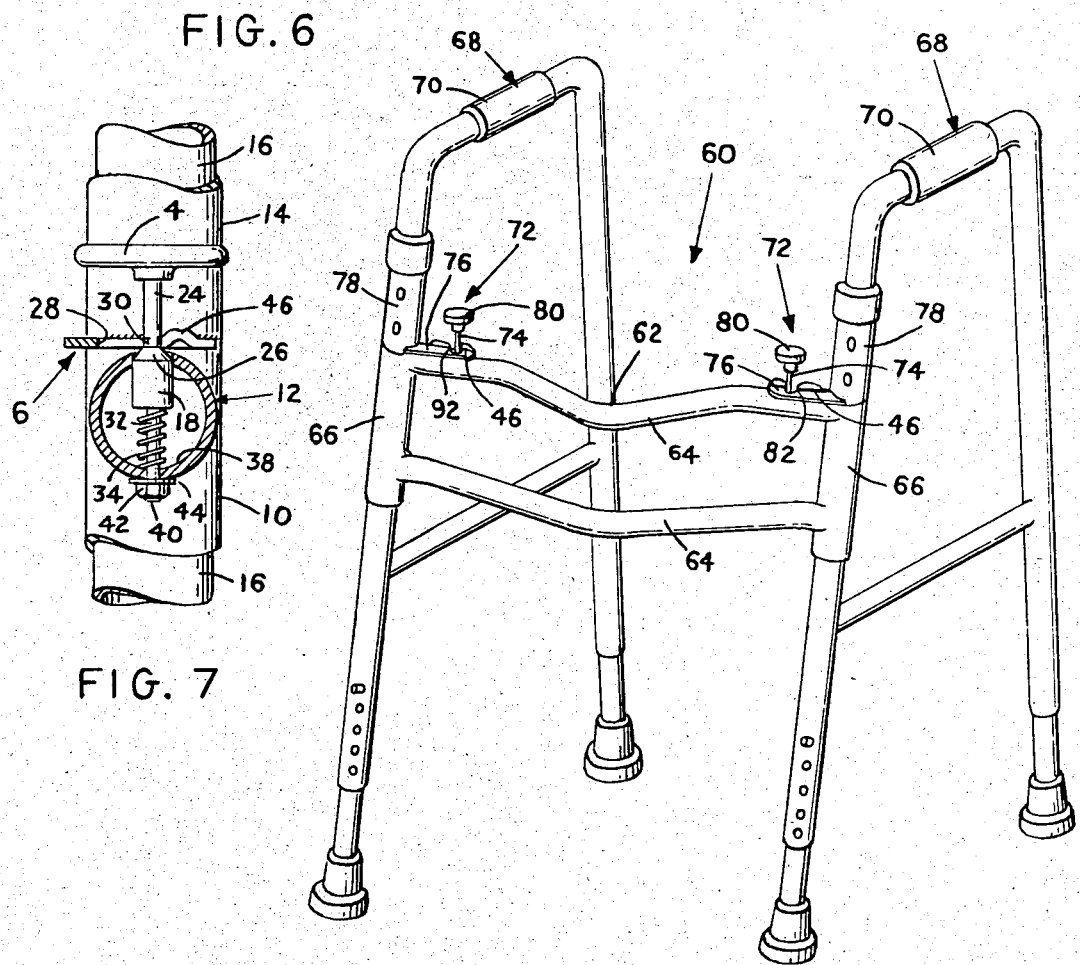
FIG. 6 is a side sectional view similar to FIG. 3, showing the locking assembly in the engage position.
FIG. 7 is a sectional view taken through Line 7—7, in FIG. 5, showing the locking assembly in the disengaged position.
FIG. 8 is a fragmentary perspective view of a locking assembly in accordance with an alternate embodiment of the invention.
FIG. 9 is a perspective of an invalid walker in accordance with the present invention.

Referring to FIG. 1, the locking assembly of the present invention is illustrated in perspective and comprises a spring biased reciprocating latch 2, a plunger 4 attached to latch 2, and a catch plate 6 adapted to releasably engage latch 2. The present locking assembly is adapted for use with paired articulated pivoting members, to enable such members to remain fixed with respect to each other at a given point along their respective paths of rotation. The fragmentary illustration in FIG. 1 relates to a specific instance of such articulation, and is drawn from the device illustrated in FIG. 9, which comprises a foldable walker. The first pivoting member 8 in FIG. 1 comprises the adjacent portion of the cross brace of the foldable walker, including its bearing sleeve 10, and the cross bar 12, in which latch 2 is mounted.

The second pivoting member utilized in the present illustrations, comprises a sleeve 14 that is fixedly mounted upon one of the connected gate legs 16, that is positioned within bearing sleeve 10 and is adapted for rotation there within. The general environment of this construction is well known in the art, and is illustrated in the U.S. patents listed earlier herein and incorporated herein by reference.

In the present invention, and as shown in FIG. 1, sleeve 14 is provided with catch plate 6 that is essentially planar and extends outwardly and generally transverse to the axis of sleeve 14. It can be visualized that as sleeve 14 rotates counter clockwise with gate leg 16, catch 6 will rotate into communication with latch 2.

Essentially, then, sleeve 14, gate leg 16 and bearing sleeve 10 correspond in construction to a conventional hinge, so that the applicability of the present invention to alternate constructions wherein rotating articulated members are concerned, can be seen.

Referring now to FIG. 2, latch 2 can be seen to comprise a longitudinally extended locking bolt 18 that is adapted to retractably protrude from the first pivoting member comprising cross bar 12. Latch 2 is mounted transverse to the axis of cross bar 12 as shown, and appropriate holes 20 and 22 are provided in cross bar 12 for this purpose. In particular, hole 20 has a diameter sufficient to permit locking bolt 18 to pass freely therethrough. Hole 22, when provided, may be of lesser diameter than hole 20, to receive and engage the anchoring means associated with locking bolt 18, and discussed later on herein.

Preferably, locking bolt 18 is essentially cylindrical as shown, though it is to be understood that exact cross sectional shape may vary. Thus, though not illustrated herein, locking bolt 18 may be triangular, square or rectangular in cross section, with an appropriately configured hole 20, permitting passage of locking bolt 18 therethrough. Such variations are contemplated within the scope of the present invention.

Referring further to FIG. 2, latch 2 includes a reduced diameter guide rod 24 that extends upward from locking bolt 18, and is positioned externally with respect to cross bar 12. Guide rod 24 serves to position catch 6 with respect to latch 2 during their engagement, in the manner illustrated more particularly in FIGS. 4-8 herein. Particularly and as will be discussed with reference to FIG. 8, guide rod 24 provides one of two pivot axes upon which the catch plate illustrated therein translates into a position of substantial alignment with cross bar 12 when the locking assembly is in its fullest disengagement.

Referring further to FIG. 2 a preferably frustoconical cam surface 26 is defined between locking bolt 18 and guide rod 24. Cam surface 26 is adapted to slidably engage catch plate 6 during its travel past latch 2. Thus, as illustrated in FIGS. 5 and 7, catch plate 6 rides along the beveled surface of cam 26 both after and before locking bolt 18 is engaged. Cam 26 also cooperates with the catch plate 6 to assure a smooth initial engagement thereof, in the embodiment illustrated in FIGS. 1-7, as described below.

Catch plate 6 defines a collar 28 that is adapted to releasably retain locking bolt 18, as shown clearly in FIG. 4. Collar 28 is preferably sized and configured to correspond to the cross sectional configuration of locking bolt 18, as noted earlier. In particular, collar 28 slidably receives locking bolt 18 and is thus desirably sized to permit slidable reception and firm retention thereof.

Catch plate 6 includes a track 30 that communicates with collar 28 as illustrated and defines an access way for latch 2 to enter an escape from collar 28. As shown in FIGS. 5 and 7, guide rod 24, cam 26 and track 30 cooperate during the relative movement of catch plate 6 with respect to latch 2. As shown in FIGS. 4 and 5, the width of track 30 generally corresponds to the diameter of guide rod 24, and is sufficiently larger to permit unobstructed rovement of guide rod 24 through track 30. The exact dimension of track 30 is not critical, so long as it is less than the diameter of collar 28, so.as to permit collar 28 to successfully perform its function.

Referring again to FIG. 2, plunger 4 is mounted on guide rod 24 on the free end thereof, and is provided to receive and transmit pressure against locking bolt 18, to urge locking bolt 18 into the retracted position shown in FIGS. 5 and 7, to permit latch 2 to disengage from collar 28. The exact shape and size of plunger 4 may vary depending upon its application. In the instance where the locking assembly is utilized in a device for the physically handicapped and infirm, plunger 4 is preferably rounded and of sufficiently large size to permit comfortable application of palm pressure by the infirm individual, to release latch 2 from catch plate 6 as described. Also, plunger 4 may be prepared from a variety of structural materials, again depending upon its ultimate use, and may, in the instance of collapsible invalid walkers, be prepared from a relatively hard synthetic resinous material. Optionally, plunger 4 may be provided with a relatively soft flexible cover, to add greater comfort to the user. Such modifications are considered within the scope of the present invention.

Latch 2 includes a spring biasing means associated with locking bolt 18, as illustrated in FIG. 2 in detail. The spring biasing means may be mounted within the first pivoting member, cross bar 12 for example, and is adapted to resist the retraction of locking bolt 18, that is caused by the exertion of force against plunger 4.

The spring biasing means as illustrated comprises a reduced diameter connecting shaft 32 that extends from locking bolt 18 in a direction away from plunger 4, and provides a support and guide for coil spring 34 that is adapted to ride thereover. A transverse surface of locking bolt 18 facing away from cam 26 comprises a land 36 against which one end of coil spring 34 abuts. At its other end, coil spring 34 as illustrated, urges against the stationary inside wall 38 of cross bar 12 adjacent hole 22.

The spring biasing means includes an anchoring means that secures spring 34 in position. The anchoring means illustrated herein, comprises a threaded end 40 of connecting shaft 32, and an appropriately threaded nut 42 and associated washer 44. As shown in FIG. 3, nut 42 and washer 44 engage threaded end 40 of connecting shaft 32, to anchor latch 2 within cross bar 12, but to permit latch 2 to reciprocate in response to force applied against plunger 4.

The construction of latch 2 can thus be seen to be extremely simple, as few moving parts are involved. This simplicity in construction effects a corresponding economy and manufacture as well as durability and use, because fewer parts must be made which could break down over time.

As mentioned earlier, the present invention contemplates alternate embodiments, wherein the catch plate 6 varies in construction. In the embodied illustrated in FIGS. 1-7, the catch plate 6 is open ended and track 30 terminates in a mouth 46 that may be slightly outwardly flared, as illustrated in FIG. 1, or simply a continuation of track 30, as illustrated in FIG. 2. Mouth 46 permits catch plate 6 to completely disengage from latch 2 as shown in FIG. 1. The catch plate 6 as illustrated in this first embodiment is stationary with respect to its supporting pivoting member, sleeve 14. The employment of the catch plate of this embodiment confers an economy in manufacture and operation, as catch plate 6 per se is not a moving part.

Referring further to the FIGURES, catch plate 6 as illustrated in this first embodiment, is preferably essentially planar, however mouth 46 is disposed at a slight incline, in the direction of plunger 4. This incline is suggested in FIG. 1 and seen more clearly in the frontal view of catch 6 in FIG. 2, and in the side view thereof in FIG. 7. This incline permits mouth 46 to slide over the beveled surfaces of cam 26 as catch plate 6 engages latch 2, and gradually urges latch 2 downward so that locking bolt 18 assumes the retracted position necessary to permit catch plate 6 to travel there past. The exact angular displacement of the incline of mouth 46 is not critical, and may comprise any generally acute angle. Preferably, however, such angle should probably not exceed 45°, as too sharp an incline may develop resistance during the engagement of mouth 46 with cam 26.

An alternate embodiment of the locking assembly is illustrated in perspective in FIG. 8 wherein the catch plate 48 comprises a movable strip defining a collar 50 at one end thereof and a longitudinally extended closed track 52 connected thereto. Catch plate 48 may be attached to sleeve 14 by pivotal mounting upon support bracket 54 that is positioned 180° away from catch plate 6 as illustrated in FIG. 1. Catch plate 48 is pivotally attached to support bracket 54 about pivot axis 56, and is adapted as shown to pivot about a second axis defined by guide rod 24. Thus, when bracket 54 is rotated into axial alignment with cross bar 12, catch plate 48 travels along guide rod 24 and moves into a position of general axial alignment, as well. While this position is not illustrated herein, the movement of catch plate 48 is similar to that shown in FIG. 4 of U.S. Pat. No. 3,945,389, and the relevant disclosure thereof is accordingly incorporated herein by reference.

In accordance with a further embodiment of the present invention, a collapsible walker may be constructed as shown in FIG. 9. Walker 60 comprises a cross brace 62 comprising parallel cross bars 64, similar to the cross bar element 12 illustrated in FIG. 1, and transversely extending laterally positioned bearings 66. Substantially U-shaped gate legs 68 are disposed in pairs with connecting U portions 70, conventionally utilized by the invalid for support during walking. The forward most gate legs are seen to be mounted within bearings 66 for rotation therein in conventional manner. As can be visualized, gate legs 68 can rotate from the opened position illustrated in FIG. 9, to the closed position seen regularly in the patents cited of record earlier herein.

Walker 60 includes the locking assembly of the present invention generally designated 72. In particular two locking assemblies 72 are shown, positioned at the lateral extermities of the upper cross bar 64. Latches 74 are positioned within cross bar 64, while catch plates 76 are mounted upon sleeves 78 fixedly mounted upon the adjacent portion of gate legs 68. Without further illustration herein, it is apparent that the depression of plungers 80, by palm pressure of the user, permits the user to rotate gate legs 68 toward each other, to thereby collapse walker 60 for storage during non-use. Correspondingly, simple outward rotation of gate legs 68 is all that is necessary to resume the open operable position, as the mouth of catch plate 76 engages the cam surface of the latch 74 as described earlier, depressing the latch until alignment is reached between the latch 74 and the collar 82 of catch plate 76, whereupon latch 74 springs upward into locking engagement.

As mentioned earlier, the present locking assembly is useful with a variety of products, wherein articulated rotating members are desirably releasably fixed in position with respect to each other. Thus, the present invention could be utilized with folding furniture and other structural products in addition to the invalid appliances, one of which is illustrated herein. Correspondingly, while the present invention is graphically illustrated as manufactured from metal, it is to be understood that other suitable structural materials may be utilized, depending upon the end use of the products involved. Thus, while light weight materials such as aluminum may be employed, other metals such as steel, copper and the like are also suitable. Additionally, suitable structural plastics having desired hardness, resilience, formability and surface lubricating properties are contemplated herein and may all be used.

It is understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A collapsible walker for the elderly and the infirm, comprising:
   A. a cross brace having a bearing at each of its extremities;
   B. a pair of gate legs, with one of said gate legs pivotally mounted in each of said bearings for rotation between an opened position, wherein said gate legs are positioned generally transverse to said cross brace, and a collapsed position wherein said gate legs are folded against said cross brace; and
   C. a releasable locking assembly mounted on each gate leg and said cross brace adjacent the extremities thereof, each said locking assembly adapted to releasably lock the respective gate leg in the opened position with respect to said cross brace; each said locking assembly comprising:
      (a) a spring biased reciprocating latch;
      (b) a plunger attached to said latch;
      (c) an open ended catch plate adapted to releasably engage said latch;
      (d) said spring biased latch reciprocably mounted within said cross brace and comprising a longitudinally extended locking bolt adapted for retractable protrusion from said cross brace, a reduced diameter guide rod extending from said locking bolt external to said cross brace, and a cam surface located between said locking bolt and said guide rod, and adapted to slidably engage said catch plate;
      (e) said catch plate mounted external to the respective gate leg and substantially parallel to said cross brace when said gate leg is in said opened position and substantially transverse to said cross brace when in said collapsed position, said catch plate comprising a collar adapted to releasably retain said locking bolt, and a track communicating with said collar defining an access way for said latch to enter and escape from said collar; and
      (f) said plunger mounted on said guide rod on the free end thereof, to receive and transmit pressure against said locking bolt to urge said locking bolt into the retracted position, for release from said collar.

2. The collapsible walker of claim 1 wherein said locking bolt is essentially cylindrical, and said collar is sized to slidably receive said locking bolt.

3. The collapsible walker of claim 1 wherein said guide rod travels through said track during the engagement and disengagement of said latch and said catch plate, and said track has a width slightly larger than the diameter of said guide rod.

4. The collapsible walker of claim 1 further wherein said spring biasing associated with said locking bolt is mounted within said cross brace, adapted to resist the retraction of said locking bolt by the exertion of downward pressure on said plunger.

5. The collapsible walker of claim 4 wherein a reduced diameter connecting shaft extends from said locking bolt away from said plunger, and said spring biasing comprises a coil spring adapted to ride over said connecting shaft to urge at one end thereof against said locking bolt, and at the opposite end thereof against said cross brace and an anchoring means attached to the free end of said connecting shaft, to retain said spring in position along said connecting shaft.

6. The collapsible walker of claim 5 wherein said connecting shaft is adapted to receive said anchoring means, and extends past said cross brace, whereby said anchoring means also retains said latch within said cross brace.

7. The collapsible walker of claim 6 wherein the free end of said connecting shaft is threaded, and said anchoring means comprises a threadably engagable nut and a washer.

8. The collapsible walker of claim 1 wherein said catch plate includes a mouth, and said track extends between said collar and said mouth to permit said latch to escape from said catch plate.

9. The collapsible walker of claim 8 wherein said catch plate is essentially planar, with said mouth disposed in a plane positioned at an incline in the direction of said plunger.

* * * * *